US008813604B2

(12) United States Patent
Geist et al.

(10) Patent No.: US 8,813,604 B2
(45) Date of Patent: Aug. 26, 2014

(54) PENDULUM VIBRATION ABSORBER ON A CRANKSHAFT

(75) Inventors: Bruce Geist, Sterling Heights, MI (US); Christopher S. Barron, Royal Oak, MI (US); William F. Resh, E. Lansing, MI (US); Md Imran Hossain, Rochester Hills, MI (US); Michael P. Patyi, Rochester Hills, MI (US); Stan M. Mashkevich, White Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/277,443

(22) Filed: Oct. 20, 2011

(65) Prior Publication Data
US 2013/0098198 A1 Apr. 25, 2013

(51) Int. Cl.
*F16C 3/10* (2006.01)
*B23P 11/00* (2006.01)
*F16C 3/06* (2006.01)
*F16F 15/14* (2006.01)
*F16F 15/26* (2006.01)

(52) U.S. Cl.
CPC .............. *F16F 15/145* (2013.01); *F16F 15/26* (2013.01)
USPC ........... 74/604; 74/574.2; 74/603; 123/192.2; 180/381

(58) Field of Classification Search
CPC ................................. F16F 15/145; F16F 15/26
USPC ................. 74/604, 595, 596, 574; 123/192.1, 123/192.2; 310/51; 188/378; 180/381
See application file for complete search history.

(56) References Cited

U.S. PATENT DOCUMENTS

| 2,245,239 A | * | 6/1941 | Williams | 74/604 |
|---|---|---|---|---|
| 2,272,189 A | * | 2/1942 | De Pew | 74/604 |
| 2,316,288 A | * | 4/1943 | Salomon | 74/604 |
| 2,332,072 A | * | 10/1943 | Gregory et al. | 74/604 |
| 2,454,720 A | * | 11/1948 | Selden | 74/604 |
| 2,496,836 A | * | 2/1950 | Williams | 74/604 |
| 2,535,958 A | * | 12/1950 | Sarazin | 74/574.3 |
| 3,874,818 A | * | 4/1975 | Saunders et al. | 416/144 |
| 3,932,060 A | * | 1/1976 | Vincent et al. | 416/145 |
| 4,218,187 A | * | 8/1980 | Madden | 416/145 |

(Continued)

FOREIGN PATENT DOCUMENTS

| DE | 102006028556 A1 | * | 1/2007 |
|---|---|---|---|
| DE | 102008051607 A1 | | 4/2010 |
| EP | 0008303 A1 | | 2/1980 |
| GB | 2186051 A | | 8/1987 |

OTHER PUBLICATIONS

Steven W. Shaw and Bruce Geist, Tuning for Performance and Stability in Systems of Nearly Tautochronic Torsionals Vibration Absorbers, Journal of Vibration and Acoustics, Aug. 2010, 041005-1-041005-11, vol. 132.

(Continued)

*Primary Examiner* — Vinh Luong
(74) *Attorney, Agent, or Firm* — Ralph E Smith

(57) ABSTRACT

An apparatus for damping vibrations in an internal combustion engine. The apparatus includes a crankshaft with a lobe. The lobe has a flange with an opening that is coupled to the body of the lobe. A pendulum is pivotally coupled to the flange in a manner to allow the pendulum to follow an epicycloidal path of movement.

22 Claims, 10 Drawing Sheets

(56) References Cited

U.S. PATENT DOCUMENTS

| | | | |
|---|---|---|---|
| 4,739,679 A * | 4/1988 | Berger et al. | 74/574.3 |
| 4,779,316 A * | 10/1988 | Cherry et al. | 74/603 |
| 4,819,593 A * | 4/1989 | Bruener et al. | 123/192.2 |
| 5,072,801 A * | 12/1991 | Freymann et al. | 180/68.5 |
| 5,495,924 A * | 3/1996 | Shaw et al. | 188/378 |
| 5,884,735 A * | 3/1999 | Eckel et al. | 188/378 |
| 5,976,020 A * | 11/1999 | Lohaus et al. | 464/3 |
| 6,026,776 A * | 2/2000 | Winberg | 123/192.1 |
| 6,427,656 B1 * | 8/2002 | Drecq et al. | 123/192.1 |
| 6,450,065 B1 * | 9/2002 | Eckel et al. | 74/574.4 |
| 6,688,272 B2 * | 2/2004 | Brevick et al. | 123/192.2 |
| 6,945,209 B2 * | 9/2005 | Franke | 123/192.1 |
| 7,004,294 B2 * | 2/2006 | Williams | 188/378 |
| 7,509,890 B2 * | 3/2009 | Cagney et al. | 74/595 |
| 8,146,457 B2 * | 4/2012 | Wright | 74/574.2 |
| 2002/0046623 A1 * | 4/2002 | Carlson et al. | 74/574 |
| 2003/0183187 A1 * | 10/2003 | Menzel et al. | 123/192.2 |
| 2003/0221653 A1 | 12/2003 | Brevick et al. | |
| 2009/0000589 A1 * | 1/2009 | Weinzierl et al. | 123/192.2 |
| 2011/0031058 A1 * | 2/2011 | Klotz et al. | 180/381 |
| 2014/0053680 A1 * | 2/2014 | Wakeman | 74/604 |

OTHER PUBLICATIONS

International Search Report dated Feb. 12, 2013 for International Application No. PCT/US2012/057832, International Filing Date Sep. 28, 2012.

Written Opinion dated Feb. 12, 2013 for International Application No. PCT/US2012/057832, International Filing Date Sep. 28, 2012.

* cited by examiner

PENDULUM VIBRATION ABSORBER ON A CRANKSHAFT

FIELD

The present disclosure relates to an apparatus for absorbing vibrations from an internal combustion engine and a method of forming the apparatus.

BACKGROUND

A crankshaft in a vehicle translates the reciprocating linear motion of an engine's pistons into rotational motion. In so doing, torsional vibrations are generated that emanate through the vehicle. A four cycle engine with 8, 6, or 4 cylinders tends to produce (respectively) 4, 3 or 2 combustion pulse accelerations per engine revolution. These combustion pulses tend to accelerate the crank and driveline at a frequency that is a multiple of 4, 3 or 2 of the average rotational speed of the engine. Vibrations generated as a result of these pulsations may be uncomfortable for the operator and/or passengers of the vehicle and are unwanted. Vibrations are directly transferred to the passenger compartment when the torque converter is locked to increase the fuel efficiency of the vehicle. To reduce the vibrations, the crankshaft may have a frequency tuned dampener that counteracts vibrations at certain frequencies. However, the frequency tuned dampener only operates at one frequency and does not reduce vibrations that occur at other frequencies.

Alternatively, a circular-path pendulum, with a properly calibrated swing radius, may be attached to the crankshaft at a calibrated distance from its center of rotation. This sort of pendulum can act to reduce torsional vibrations that occur at a frequency that is a specific order or multiple of average engine speed. One drawback of a circular-path pendulum, however, is that if the pendulum is overdriven, it may act as a torsional amplifier instead of as an absorber. This could result in increased powertrain vibrations that may cause damage to the vehicle and discomfort to the operator and passengers of the vehicle. Therefore the inventors herein recognized a need for improvement in the field.

SUMMARY

The present disclosure provides an apparatus for damping vibrations in an internal combustion engine. The apparatus includes a crankshaft comprising a lobe. The lobe includes a body, a flange coupled to the body, the flange having two openings therein, and a pendulum having two openings therein that are substantially the same size and shape as the two openings on the flange, except that they are rotated by 180 degrees within a plane perpendicular to the crankshaft axis. The lobe further includes two pins extending through the pendulum openings and the flange openings to pivotally couple the pendulum to the flange, the pendulum openings and the flange openings having an epicycloidal configuration. In one embodiment, the pendulum surrounds a portion of the flange. In another embodiment, the apparatus includes a second flange, the second flange having a second opening, the pin extending through the second opening to pivotally couple the pendulum between the flange and second flange.

The flange may be coupled to the body using a dovetail connection. The body may have a bolt opening that extends through the body from a first end to a second end of the body. The bolt opening may accept a bolt that fastens the flange to the second end of the body. The flange may have a curved slot that extends through the flange, the slot being located between the body and the flange opening. A peg may extend through the curved slot and couple to the pendulum.

The pin may be circular, and movement of the pendulum may cause the pin to roll along an inner surface of the pendulum openings and an inner surface of the flange openings. The epicycloidal configuration of the pendulum openings and the flange openings may cause the pendulum to follow an epicycloidal path when the crankshaft rotates. The epicycloidal path may lie between a tautochronic path and a cycloidal path.

The body may have a stop pad located where the pendulum contacts the body. The pendulum may have a plate that covers the pendulum openings to secure the pin within the pendulum openings and the flange openings.

The present disclosure further provides an apparatus for damping vibrations in an internal combustion engine. The apparatus includes a crankshaft that includes a plurality of lobes, where at least one of the lobes acts as a torsional absorber. The at least one lobe acting as a torsional absorber includes a body, a flange coupled to the body, the flange having a first opening and a pendulum having a first opening. The at least one lobe acting as a torsional absorber also includes a pin extending through the first pendulum opening and the first flange opening to pivotally couple the pendulum to the flange, the first pendulum opening and the first flange opening having a configuration such that the pendulum follows an epicycloidal path when the crankshaft is rotated.

The epicycloidal path followed by the pendulum may lie between a tautochronic path and a cycloidal path. If more than one lobe is acting as a torsional absorber, the pendulums of those lobes may all follow the same epicycloidal path when the crankshaft is rotated.

The flange may have a second opening and the pendulum may have a second opening. A second pin may extend through the second pendulum opening and the second flange opening.

The present disclosure further provides a method of forming an apparatus for damping vibrations in an internal combustion engine. The method includes forming an opening in a flange, forming an extension on one end of the flange, and forming a channel that corresponds to the extension on a lobe of a crankshaft. The method further includes sliding the extension of the flange into the channel of the lobe, aligning an opening in a pendulum with the opening in the flange and placing a pin within the pendulum opening and the flange opening to pivotally couple the pendulum to the flange.

The method may further include placing a peg through a curved slot that extends through the flange, the slot being located between the lobe and the flange opening, and removing a rod from a flange, the rod balancing the pendulum during the step of placing a pin.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
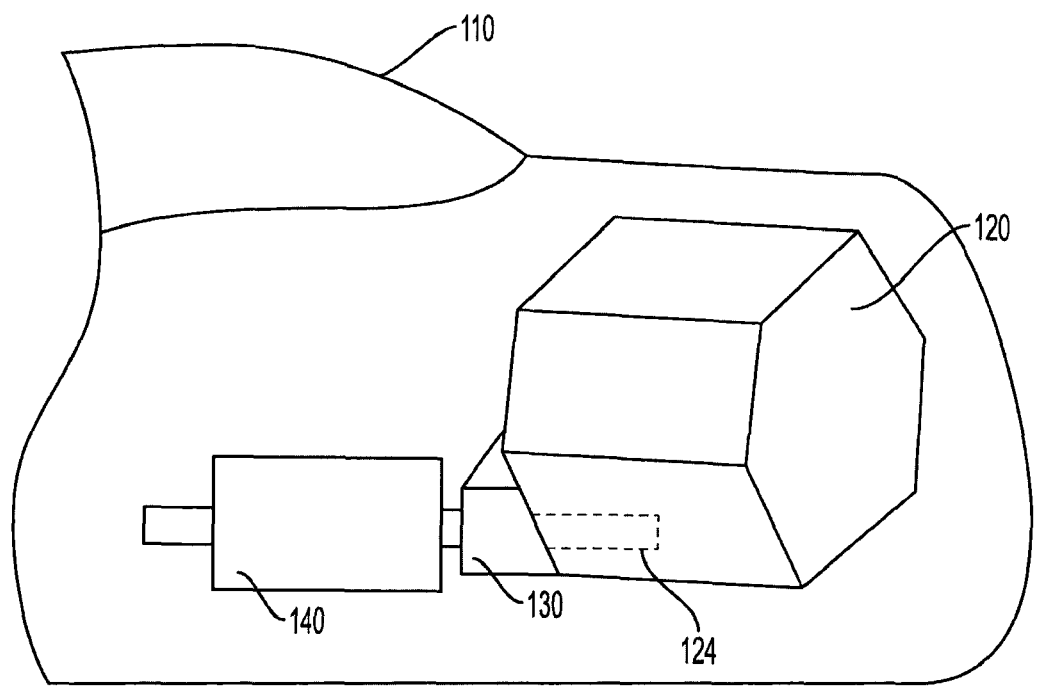
FIG. 1 illustrates a vehicle with an internal combustion engine in accordance with an exemplary embodiment.

FIG. 1 illustrates a vehicle 110 with an internal combustion engine 120, a torque converter 130, and a transmission 140 according to an exemplary embodiment. The engine 120 has a plurality of cylinders (not shown) formed therein. Each cylinder contains a piston (not shown) that reciprocates during operation of the engine 120. The pistons are mechanically coupled to a crankshaft assembly 124 via connecting rods. The crankshaft assembly 124 is mechanically coupled to the torque converter 130. The torque converter 130 transfers torque generated by the engine 120 to the transmission 140 to power the vehicle's wheels. It should be understood that FIG. 1 is a basic diagram of a vehicle. Additional parts and other configurations may be implemented without diverging from the scope of this application.

Figure 2:
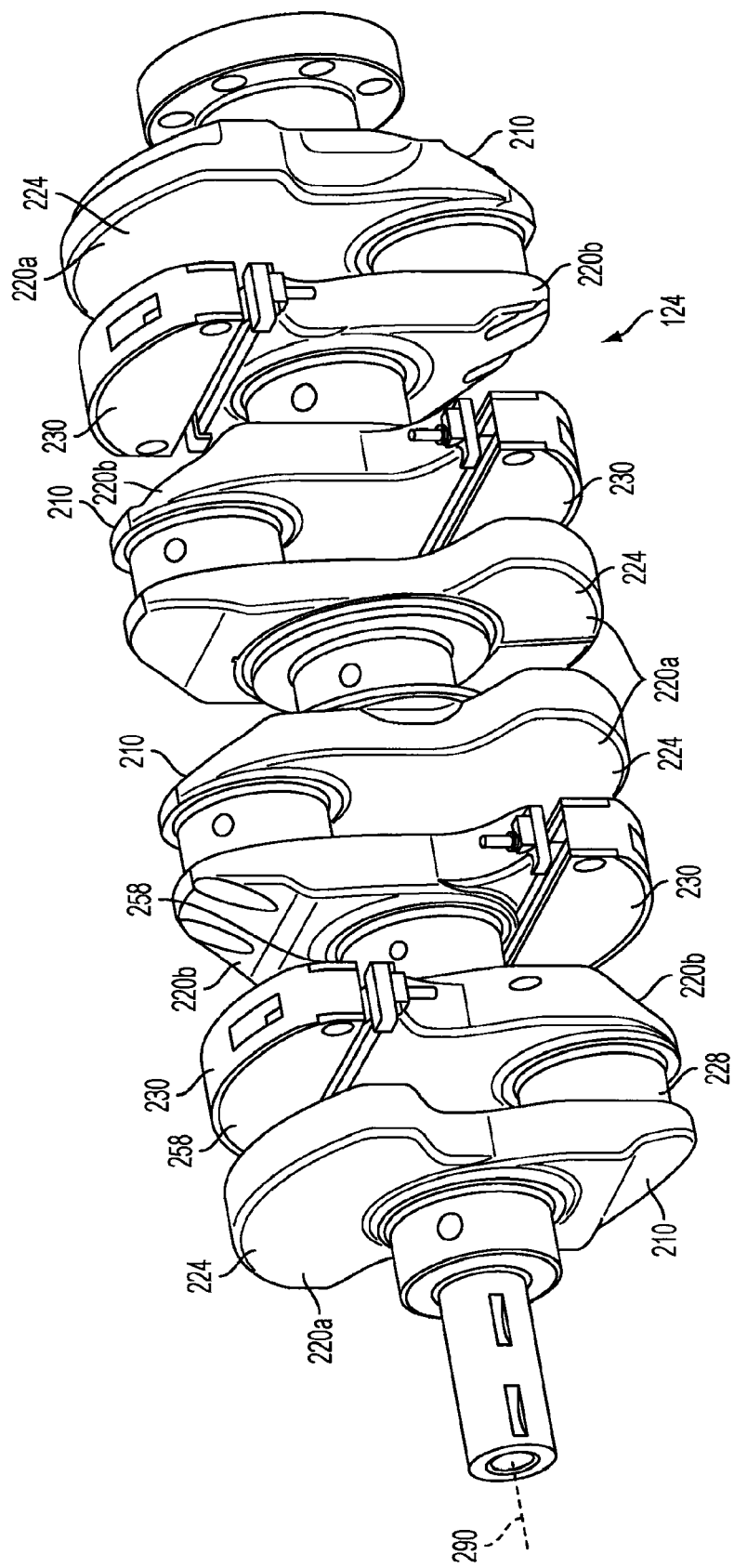
FIG. 2 illustrates a crankshaft in accordance with an exemplary embodiment.

FIG. 2 illustrates an exemplary embodiment of the crankshaft 124 in further detail. The crankshaft 124 has four interconnected crank nodes 210. In another embodiment, the crankshaft 124 may have six or eight interconnected crank nodes 210. Each crank node 210 includes a crank pin 228 and first and second lobes 220a, 220b. Each lobe 220a, 220b has an oval plate-like shape extending in a plane perpendicular to an axis of rotation 290 of the crankshaft 124. The center of each lobe 220a, 220b is aligned near the axis of rotation 290. One end of each lobe 220a, 220b is connected to the crank pin 228. The crank pin 228 connects to a single piston in the engine 120 through a connecting rod (not shown). The crank pin 228 allows a piston to rotate the crankshaft 124 along its axis of rotation 290.

The first lobe 220a of each crank node 210 contains a counterweight 224 on an end opposite the end connected to the crank pin 228. The counterweight 224 balances the motion of the piston and connecting rod assemblies within the engine 120. The counter weights 224 may be integrally formed as part of the lobe 220a or they may be attached to the lobe 220a. Moreover, in another embodiment, first lobe 220a may not contain a counterweight 224.

The second lobe 220b of each crank node 210 contains a torsional absorber 230 on an end opposite the end connected to the crank pin 228. The torsional absorber 230 may reduce the torsional vibrations on the crankshaft 124 that occur from the forces applied to the crankshaft 124 by the engine 120 through the connecting rods. The torsional absorber 230 may also reduce torsional vibrations on the crankshaft 124 that occur when the torque converter 130 is locked to enhance the efficiency of the power transfer between the engine 120 and the transmission 140. Additionally, the torsional absorber 230 may act as a counterweight to balance the motion of the piston and connecting rod assemblies within the engine 120.

In another embodiment, only two of the four crank nodes 210 contain torsional absorbers 230. In yet another embodiment, only one of the four crank nodes 210 contains torsional absorbers 230. In still another embodiment, the crankshaft 124 contains six crank nodes 210 and only two of the crank nodes 210 contain torsional absorbers 230. It should be understood that a varying number of crank nodes 210, counterweights 224, and torsional absorbers 230 may be implemented depending on the configuration of the engine 120 and the vehicle 110, and the amplitude and number of frequencies to be dampened.

Figure 3:
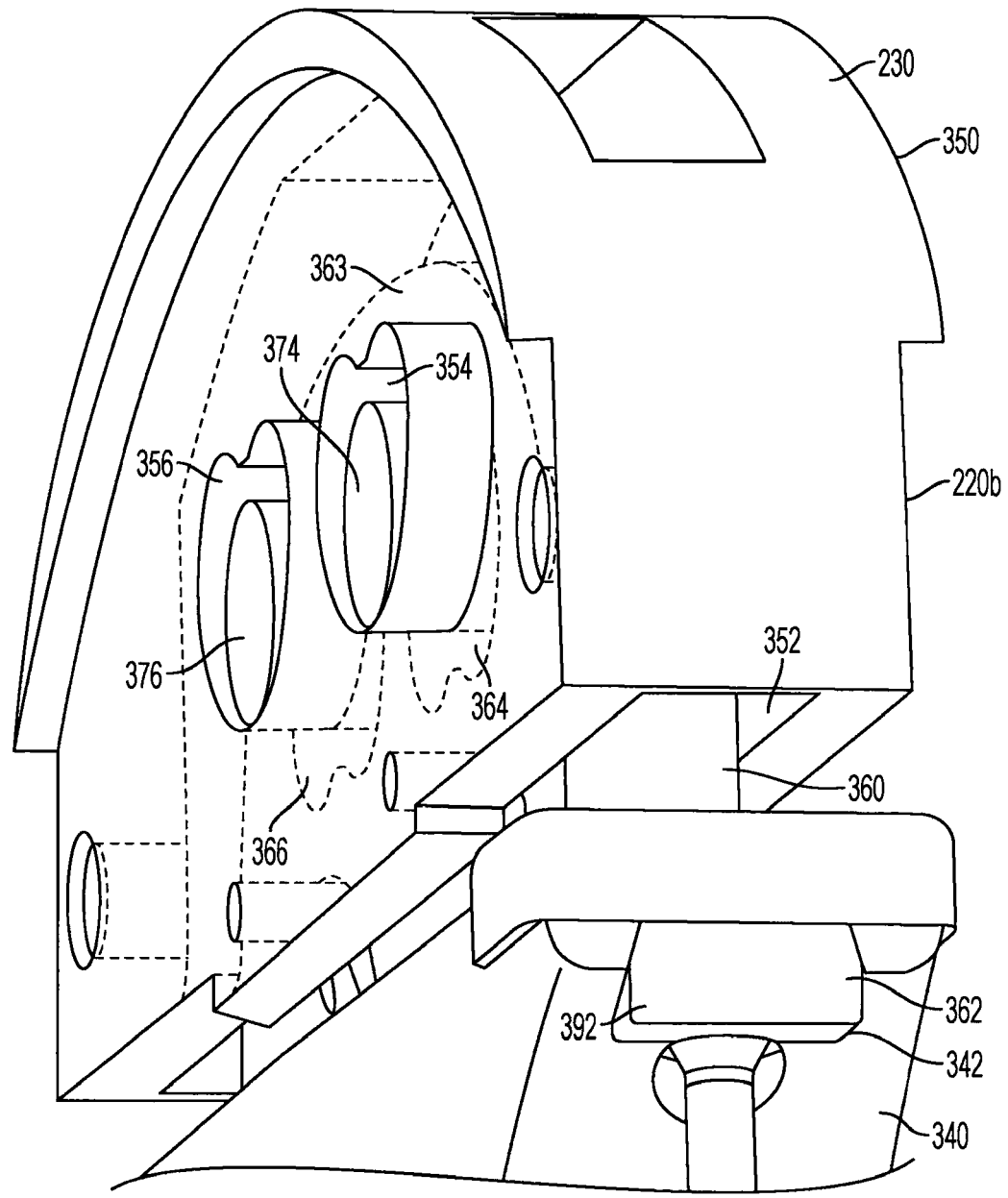
FIG. 3 illustrates a side view of a lobe from the crankshaft of FIG. 2 in accordance with an exemplary embodiment.

FIG. 3 illustrates a side view of the lobe 220b with a partially transparent torsional absorber 230 in accordance with an exemplary embodiment. The lobe 220b includes a body 340 that is coupled to the torsional absorber 230. The torsional absorber 230 includes a flange 360 that is coupled to the body 340 and a pendulum 350 that is pivotally coupled to the flange 360. In the illustrated embodiment, the flange 360 is coupled to the body 340 through a dovetail joint 392. The dovetail joint 392 is formed from an extension 362 of the flange 360 and a channel 342 in the body 340. The extension 362 is formed on one end of the flange 360 and is sized to allow the extension 362 to slide into the channel 342 formed in the body 340. The flange 360 further includes a head portion 363 that extends away from the extension 362 within the plane of the body 340. The head portion 363 includes first and second openings 364 and 366.

The pendulum 350 of the torsional absorber 230 has a flange opening 352 and a hollow interior. The pendulum 350 also has first and second openings 354, 356. The head portion 363 of the flange 360 passes through the flange opening 352 of the pendulum 350 and resides in the pendulum's 350 hollow interior. The first flange opening 364 and the first pendulum opening 354 are aligned so that a first circular pin 374 may pass through and reside within the openings 354, 364. Additionally, the second flange opening 366 and the second pendulum opening 356 are aligned so that a second circular pin 376 may pass through and reside within the openings 356, 366. The first and second pins 374, 376 pivotally couple the pendulum 350 to the flange 360 in a manner that provides the pendulum 350 with a limited range of free movement. Once the pins 374, 376 are positioned in their respective openings 354, 364, 356, 366, cover plates 258, as illustrated in FIG. 2, are attached to the sides of the pendulum 350 to secure the pins 374, 376 within the openings 354, 364, 356, 366. The cover plates 258 may be attached using a fastener, such as a bolt or screw, or an adhesive. Furthermore, one cover plate 258 may be attached to one side of pendulum 350 before the pins 374, 376 are placed in the openings 354, 364, 356, 366.

The pendulum 350 may be formed of a single material, such as, steel, tungsten, copper tungsten, tantalum, tungsten carbide, aluminum, and their alloys. The pendulum 350 may also be formed of one or more types of material. For example, the pendulum 350 may be formed of steel and have a tungsten or tantalum plug or multiple plugs to increase the mass of the pendulum 350. In another exemplary embodiment, it is desirable to position plugs of high density material in a secure manner to configure a pendulum whose center of mass is displaced away from the centerline axis of the powertrain revolution in a manner to dampen vibrations in the internal combustion engine. As another example, the pendulum 350 may be formed of aluminum and have steel or tungsten plugs to increase the mass of the pendulum 350.

Various materials, including heavy metals, may be used to increase the mass of the pendulum 350. An increase in pendulum mass without any corresponding change in pendulum size results in an increase in absorber inertia, defined as (pendulum mass)*$r^2$, where r is the distance from a center of rotation of the driveline to the center of mass of the pendulum 350. As increasing absorber inertia relative to the vehicle's power train inertia is desirable, efforts to increase the mass of pendulum 350 are also desirable. By using heavy or dense metals, the mass of the pendulum 350 may be increased without adding to packaging space requirements. Heavy metals include but are not limited to copper tungsten and tungsten carbide, for example.

Figure 4:
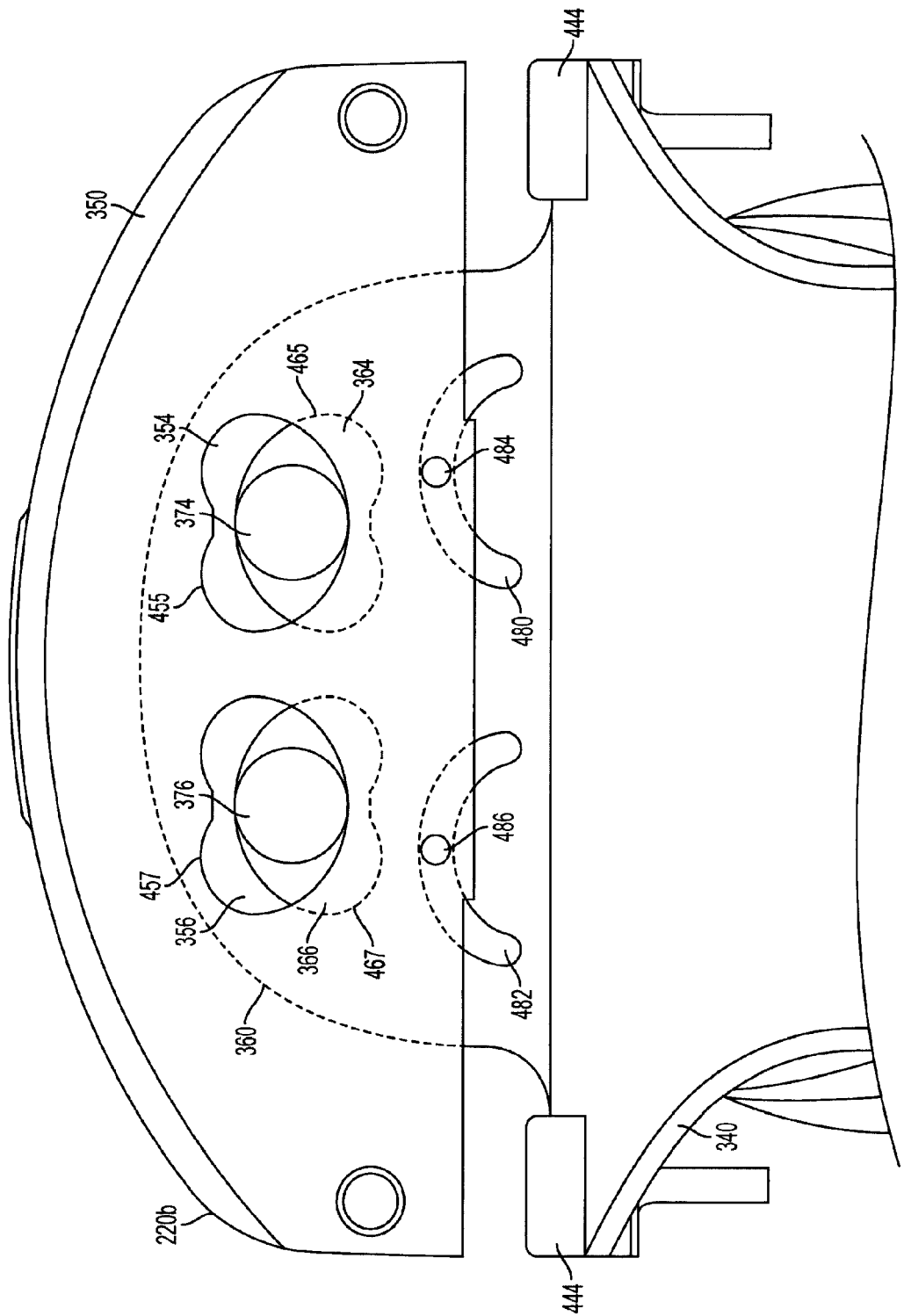
FIG. 4 illustrates a front view of a lobe from the crankshaft of FIG. 2 in accordance with an exemplary embodiment.

FIG. 4 illustrates a front view of the lobe 220b with a partially transparent torsional absorber 230 in accordance with an exemplary embodiment. Each opening 354, 356, 364, 366 within the pendulum 350 and the flange 360 has a corresponding inner surface 455, 457, 465, 467. The inner surfaces 455, 457, 465, 467 all have an identical epicycloidal configuration, but the orientation of the configurations are not identical. The epicycloidal inner surfaces 465, 467 of the openings 364, 366 of the flange 360 are rotated 180 degrees with respect to the epicycloidal inner surfaces 455, 457 of the openings 354, 356 of the pendulum 350.

When the crankshaft 124 is rotating, centripetal force causes the pendulum 350 to extend away from the axis of rotation 290 of the crankshaft 124. When this happens, the pins 374, 376 engage the inner surfaces 455, 457, 465, 467 as illustrated in FIG. 4. As the pendulum 350 moves, the first pin 374 rolls along the inner surface 455 of the first opening 354 of the pendulum 350 and the inner surface 465 of first opening 364 of the flange 360 and the second pin 376 rolls along the inner surface 457 of the second opening 356 of the pendulum 350 and the inner surface 467 of the second opening 366 of the flange 360. The rolling of the pins 374, 376 along the respective inner surfaces 455, 465, 457, 467 causes the pendulum 350 to follow a precise epicycloidal path determined by the epicycloidal inner surfaces 455, 457, 465, 467. As a result, the pendulum 350 can be urged to operate at a resonant harmonic motion that corresponds and opposes vibrations of numerous frequencies generated by the engine 120 or torque converter 130. The opposing harmonic motion of the pendulum 350 reduces the vibrations transferred throughout the vehicle 110.

Because the epicycloidal path taken by the pendulum 350 is determined by the shape of the inner surfaces 455, 457, 465, 467, the path may be tuned to account for torsional fluctuations that typically occur at frequencies that are a definite multiple of average engine speed. For example, in one embodiment, the epicycloidal path may be tuned to allow the pendulum 350 to compensate for second order vibrations generated from a four-cylinder engine. A four cylinder engine typically has large second order torsional vibration components because there are two combustion events per rotation of the crank shaft. In another embodiment, the epicycloidal path may be adjusted to allow the pendulum 350 to compensate for fourth order vibrations generated from an eight-cylinder engine.

A pendulum of fixed geometry in a rotating field has a natural frequency that is proportional to the rotational speed. As a result, a large corrective dynamic response can occur whenever the pendulum is subjected to excitations of a specific multiple of average rotational speed. That is, a beneficial dynamic response occurs at multiples of mean rotation speed rather than at specific fixed target frequencies as in the case of a frequency tuned absorber. The natural frequency of the pendulum, and hence its corrective dynamic response to a target excitation order, tracks mean engine speed. For example, the target order (n), arising from combustion, for an 8 cylinder engine is 4 and for a 6 cylinder engine the target order is 3.

A family of prospective pendulum paths may be specified by defining the configuration of the inner surfaces 455, 465, 457, 467 according to Equation 1, as follows:

$$\rho^2 = \rho_0^2 - \lambda^2 S^2 \qquad \text{Equation 1.}$$

In Equation 1, $P_0$ is the radius of curvature of the path that corresponds to the pendulum apex (furthest point from the center of rotation), and S measures arc length distance along the pendulum path from this apex. When $\lambda=0$, curvature is constant, and the resulting path is a circle of radius $P_0$. When $\lambda=1$, the resulting curve is a cycloid. For $\lambda$ between 0 and 1, the resulting curve is an epicycloid. Thus, the epicycloidal path followed by the pendulum 350, as determined by the epicycloidal inner surfaces 455, 457, 465, 467, may be tuned so that the path more closely resembles a circle, a cycloid, or any epicycloid on a continuum there between. For example, in one embodiment, a specific $\lambda$ between 0 and 1 may be chosen based on the excitation order to be corrected by the pendulum 350 that causes the pendulum's 350 tuning to be independent of its amplitude of oscillation. The tuning that generates this independent amplitude of oscillation is commonly referred to as tautochronic tuning. If the target order to be corrected is n, then the tautochronic $\lambda$ is expressed by Equation 2, below.

$$\lambda = \lambda_e = \sqrt{\frac{n^2}{n^2+1}}. \qquad \text{Equation 2}$$

When $\lambda$ is chosen in this way (in accordance with Equation 2), the resulting tautochronic epicycloidal path maintains the tuning of the pendulum 350 regardless of the magnitude of its dynamic response to the excitation order.

In another embodiment, an epicycloidal path corresponding to $\lambda$ chosen between the tautochronic value of $\lambda_e$ and 1 may be chosen for the pendulum 350. In this embodiment, at lower amplitudes of excitation, the tuning of the pendulum 350 remains nearly constant. As a result, lower to moderate torsional vibrations generated by the engine 120 may be corrected with high efficiency. However, as the pendulum response amplitude increases, which may happen when excitation levels get high, the pendulum tuning shifts away from the excitation frequency. This shift tends to mitigate the response of the pendulum 350. As a result, the pendulum 350 efficiently corrects low to moderate targeted excitation order vibrations but does not over-responding to higher excitations. Further, the pendulum 350 avoids a saturated response where the pendulum 350 may potentially hit the body 340 of the crankshaft 124. Thus, by traversing a properly chosen epicycloidal path where $\lambda$ is chosen between $\lambda_e$ and 1, the pendulum 350 corrects vibrations of low to moderate amplitude levels to produce acceptable vehicle drivability, even when there is a hard coupling between engine 120 and transmission 140 (i.e., when the torque converter is locked). At higher levels of torsional vibration, the pendulum 350 still functions without hitting the body 340 and hence without introducing objectionable vehicle noise due to this sort of impact.

It should be noted that at these higher levels of vibration, other less fuel efficient vibration control measures may be implemented, such as unlocking the transmission torque converter 130 to thereby producing a viscous coupling between engine 120 and the transmission 140. This viscous coupling of engine 120 to transmission 140 limits the vibration a driver or passenger feels within the vehicle. It is desirable to employ an apparatus that dampens the vibrations of a crankshaft that does not act as a vibrational amplifier, yet dampens vibrations at frequencies that are a specified multiple of engine rotation speed. Unfortunately, unlocking the torque converter 130 introduces inefficiencies, such as a decrease in fuel economy and other inefficiencies. An epicycloidal path where $\lambda$ is chosen between $\lambda_e$ and 1, augments the possible excitation amplitudes the pendulum 350 can absorb without hitting the body 340. At the same time, such a path preserves the pendulum's 350 capability of correcting low to moderate amplitudes that would otherwise require inefficient torque converter 130 unlock calibrations. Furthermore, having the pendulum 350 traverse a properly chosen epicycloidal path prevents the pendulum 350 from becoming a vibration amplifier even when the amplitude of the excitation order becomes large.

In an exemplary embodiment for a predetermined vehicle and powertrain rotational inertia configuration, an acceptable threshold for vibration amplitudes of the crankshaft may be 0 to 2 degree peak to peak second order crank angle deviations. A configuration of a pendulum having a tautochronic epicycloidal path tuned as described herein may be utilized with the crankshaft to reduce approximately 50% of the second order vibrations.

In another exemplary embodiment, for a predetermined vehicle and powertrain rotational inertia configuration, an acceptable threshold for driveline vibration out of the engine and into the transmission might be 0 to 1 degree peak-to-peak second order crank angle deviations. A pendulum configuration operating on the crank shaft of the engine that reduces the source vibration levels by 50% for pendulum swings induced by 0 to 2 degree peak-to-peak engine vibration amplitudes will reduce what would otherwise be 2 degree peak-to-peak oscillation amplitudes to below 1 degree peak-to-peak. If the pendulum configuration produced a tautochronic path (so that its tuning does not shift as pendulum amplitudes increases), the pendulum would tend to hit a motion pad sooner than a pendulum tuned away from a tautochronic path toward a cycloidal path. Pendulums tuned within a range of paths, not including substantially tautochronic paths but those toward cycloidal, can function within a larger range of vibration amplitudes without hitting the motion pad(s) to potentially cause powertrain noise. At the same time, the correction performance at lower amplitudes is nearly as good as substantially tautochronic path pendulums.

An additional advantage of the pendulum paths that are tuned towards cylcloids is that the bifilar slots that create the pendulum hinges tend to be narrower, and therefore impose less of a packaging burden on the design. The carrier flange, for example, can be somewhat smaller because the motion slots in which the rollers move are smaller. Similarly, the mass of the pendulum can be slightly higher, because less mass much be subtracted from the pendulum blank to create the motions slots on the pendulum.

As mentioned, at higher frequencies the pendulum 350 may contact the body 340. To reduce noise and prevent damage to either the pendulum 350 or the body 340, in one embodiment, the body 340 is equipped with stop pads 444 positioned on respective top edges of the body 340. The stop pads 444 may be made of a durable elastic material such as hydrogenated nitrile, or some other synthetic material with elastic properties. The stop pad 444 is positioned on a top portion of the body 340 where the pendulum 350 contacts the body 340 so that the pendulum 350 contacts the stop pad 444 instead of a metal portion of the body 340.

Figure 5:
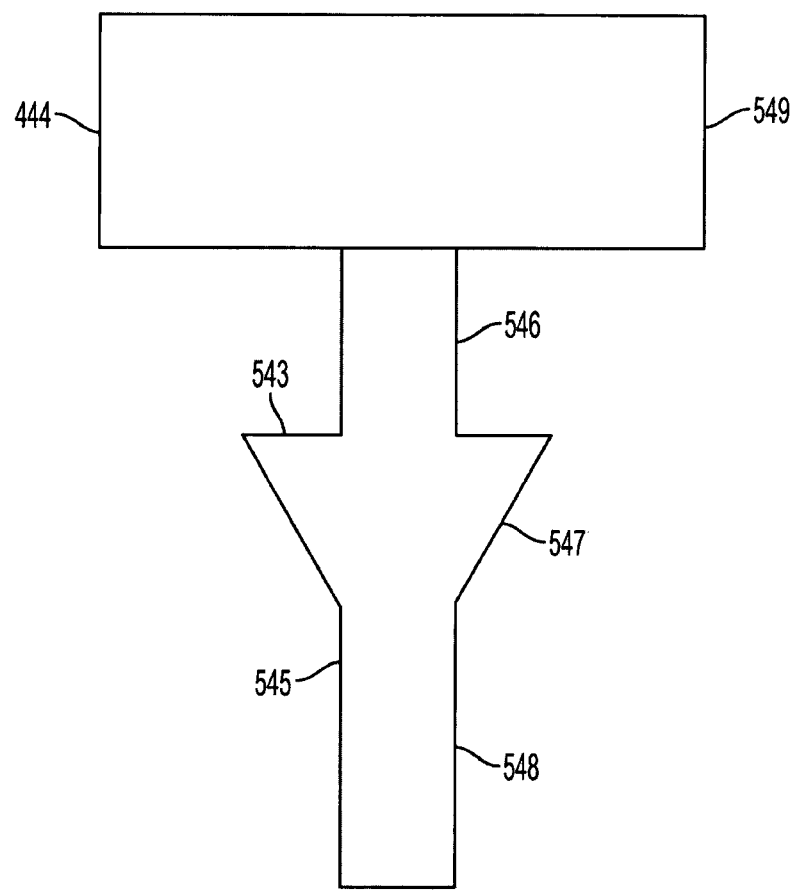
FIG. 5 illustrates a stop pad in accordance with an exemplary embodiment.

As illustrated in FIG. 5, each stop pad 444 includes a top pad 549 and a pull tab 545 in accordance with an exemplary embodiment. The pull tab 545 is attached to and extends away from the top pad 549, and has a top portion 546, a middle portion 547, and a bottom portion 548. The top and bottom portions 546, 548 have cylindrical shapes and approximately equal diameters. The middle portion 547 has a conic shape with a diameter that increases from the bottom portion 548 to the top portion 546 resulting in the formation a lip 543 between the top portion 546 and the middle portion 547.

Figure 6:
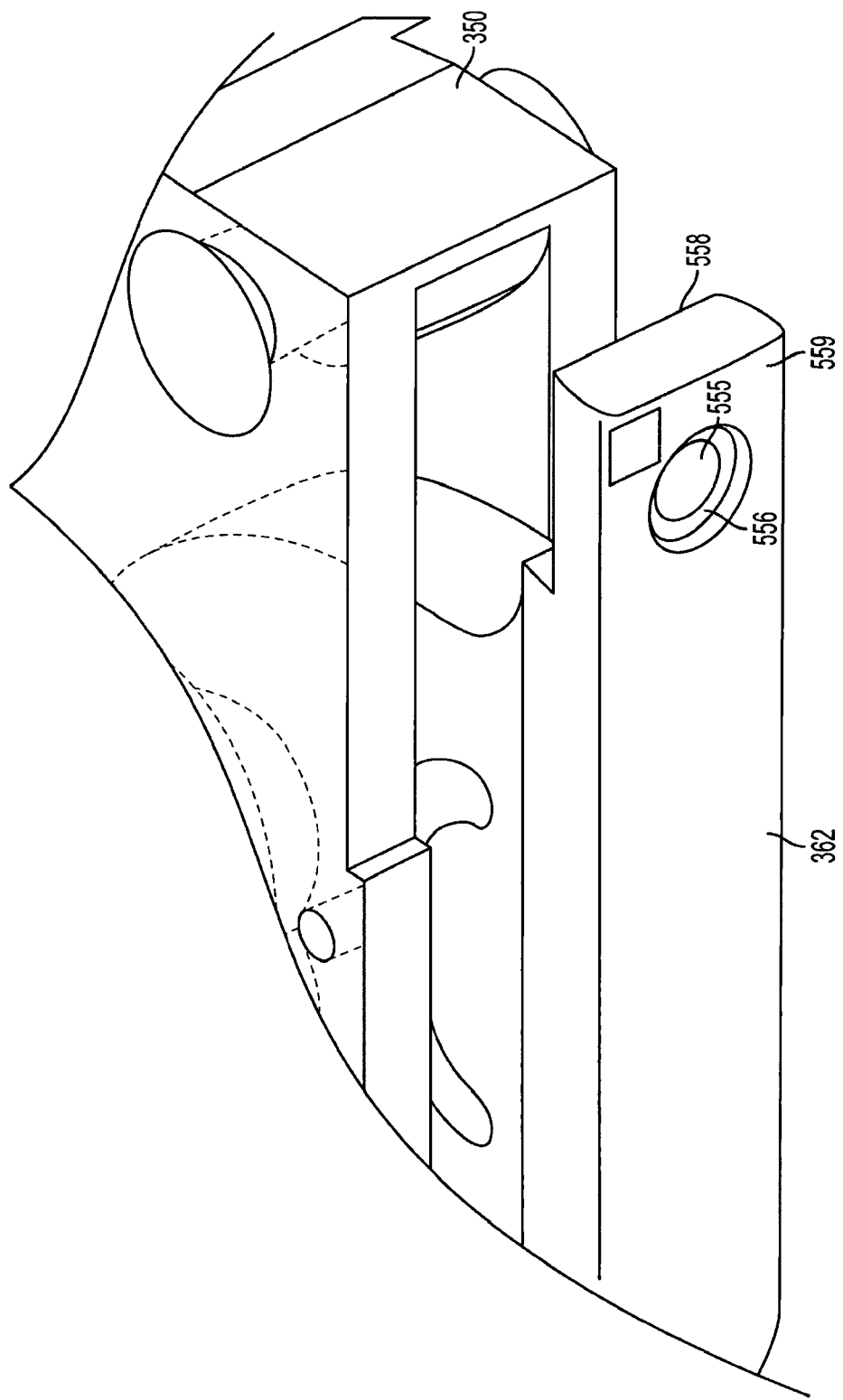
FIG. 6 illustrates a partial side view of a lobe from the crankshaft of FIG. 2 in accordance with an exemplary embodiment.
Figure 7:
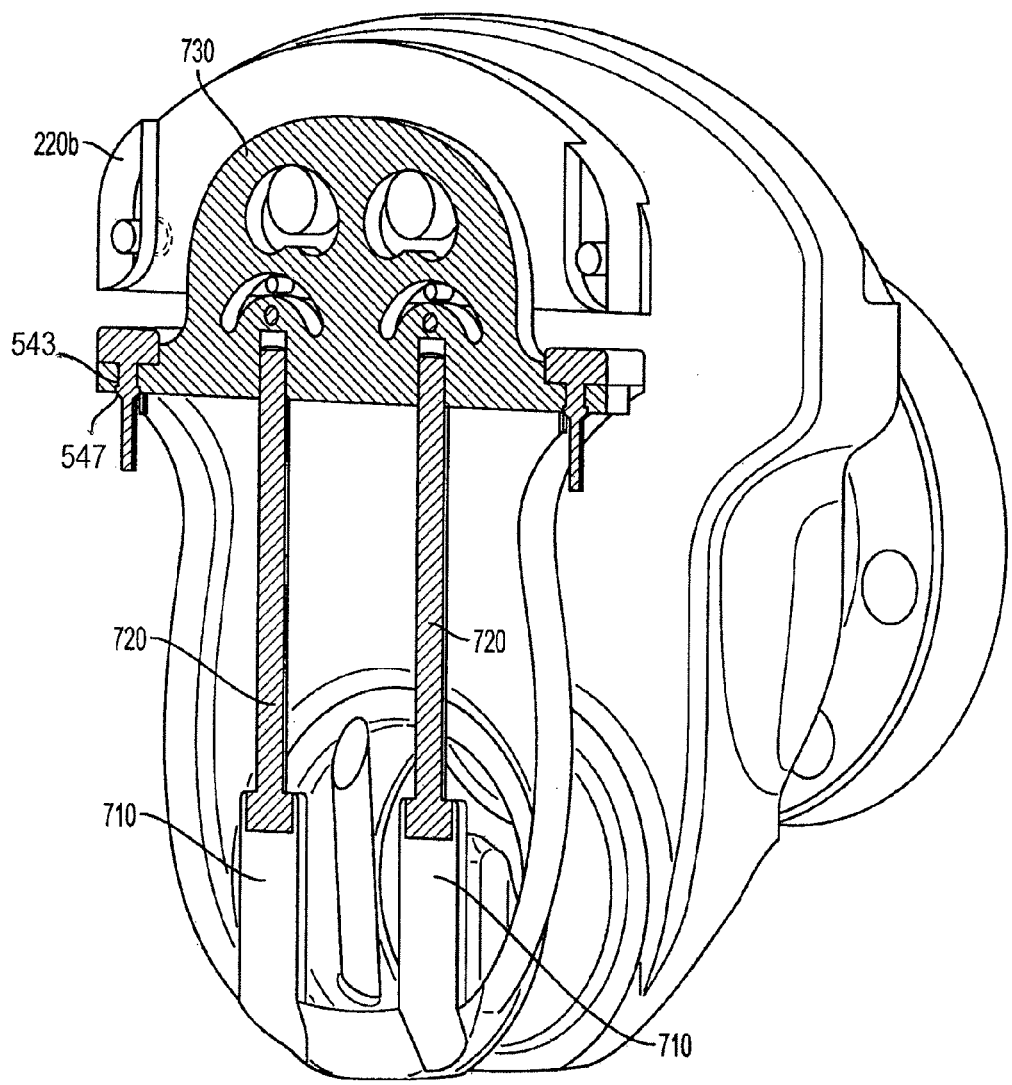
FIG. 7 illustrates a cross section of a lobe from the crankshaft of FIG. 2 in accordance with an exemplary embodiment.

FIG. 6 illustrates the extension 362 of the flange 360 without an attached stop pad 444 in accordance with an exemplary embodiment. The extension 362 has an opening 555 and a lip 556 used to secure the stop pad 444 to the extension 362. To secure the stop pad 444, the pull tab 545 is pulled through the opening 555 from a top side 558 to a bottom side 559 of the extension 362 until the middle portion 547 passes through the opening 555. As the middle portion 547 passes through the opening 555, it is constricted because the opening 555 has a smaller diameter than the middle portion 547. Once the middle portion 547 exits the opening 555, the middle portion 547 expands to its normal diameter and the lip 543 of the pull tab 545 contacts the lip 556 of the extension 362. The contact of the lip 543 of the pull tab 545 with the lip 556 of the extension 362 is illustrated in FIG. 7. As a result, the middle portion 547 cannot be pulled back into the opening 555 and the stop pad 444 is secured to the flange 360. In another embodiment, the stop pad 444 may be secured to the flange 360 using a fastener or an adhesive.

Referring again to FIG. 4, the flange 360 also includes first and second slots 480, 482. The first and second slots 480, 482 are positioned between the body 340 and the first and second openings 364, 366. Additionally, the first and second slots 480, 482 have a curved shape with ends that extend toward the body 340. The shape of the slots 480, 482 are determined according to the shape of the inner surfaces 465, 467. Each curved slot 480, 482 also houses one of the respective first and second pegs 484, 486. The first curved slot 480 houses the first peg 484 and the second curved slot 482 houses the second peg 486. The first and second pegs 484, 486 have two ends and extend through the respective slots 480, 482 so that each end connect to opposites sides of the pendulum 350. The pegs 484, 486 are sized so that they may pass along the respective slots 480, 482 without touching the inner surface of the slots 480, 482.

When the crankshaft 124 is rotating, the pegs 484, 486 float within the slots 480, 482 and move within the slots 480, 482 as the pendulum 350 moves. When the crankshaft 124 begins rotating or just before it stops rotating, the movement of the pendulum 350 is no longer controlled by the shape of the inner surfaces 455, 457, 465, 467 of the openings 354, 356, 364, 366. In these situations, the pegs 484, 486 engage their respective slot 480, 482 to help control the movement of the pendulum 350. For example, the slots 480, 482 and pegs 484, 486 may cause the pendulum 350 to contact stop pads 444 and no other portion of the body 340 when the crankshaft 124 begins rotating or just before it stops rotating. As a result, the slots 480, 482 and pegs 484, 486 may reduce clatter and possible damage to the pendulum 350 when the crankshaft 124 stops rotating or is beginning to rotate.

FIG. 7 illustrates a cross section of a lobe 220b with a torsional absorber 230 in accordance with an exemplary embodiment. As described above with respect to FIG. 3, the flange 360 is connected to the body 340 using the dovetail joint 392. The ability to removably couple the flange 360 to the body 340 allows the machining of the first and second openings 364, 366 to be accomplished while the flange 360 is not joined to the crankshaft 124. The flange 360 is further coupled to the body 340 using fasteners 720. As illustrated in FIG. 7, fastener openings 710 extend along the length of the body 340, from one end of the body 340 through the center portion to other end of the body 340. The fasteners 720 extend through the fastener openings 710 and couple to the flange 360 to secure it to the body 340.

Figure 8:
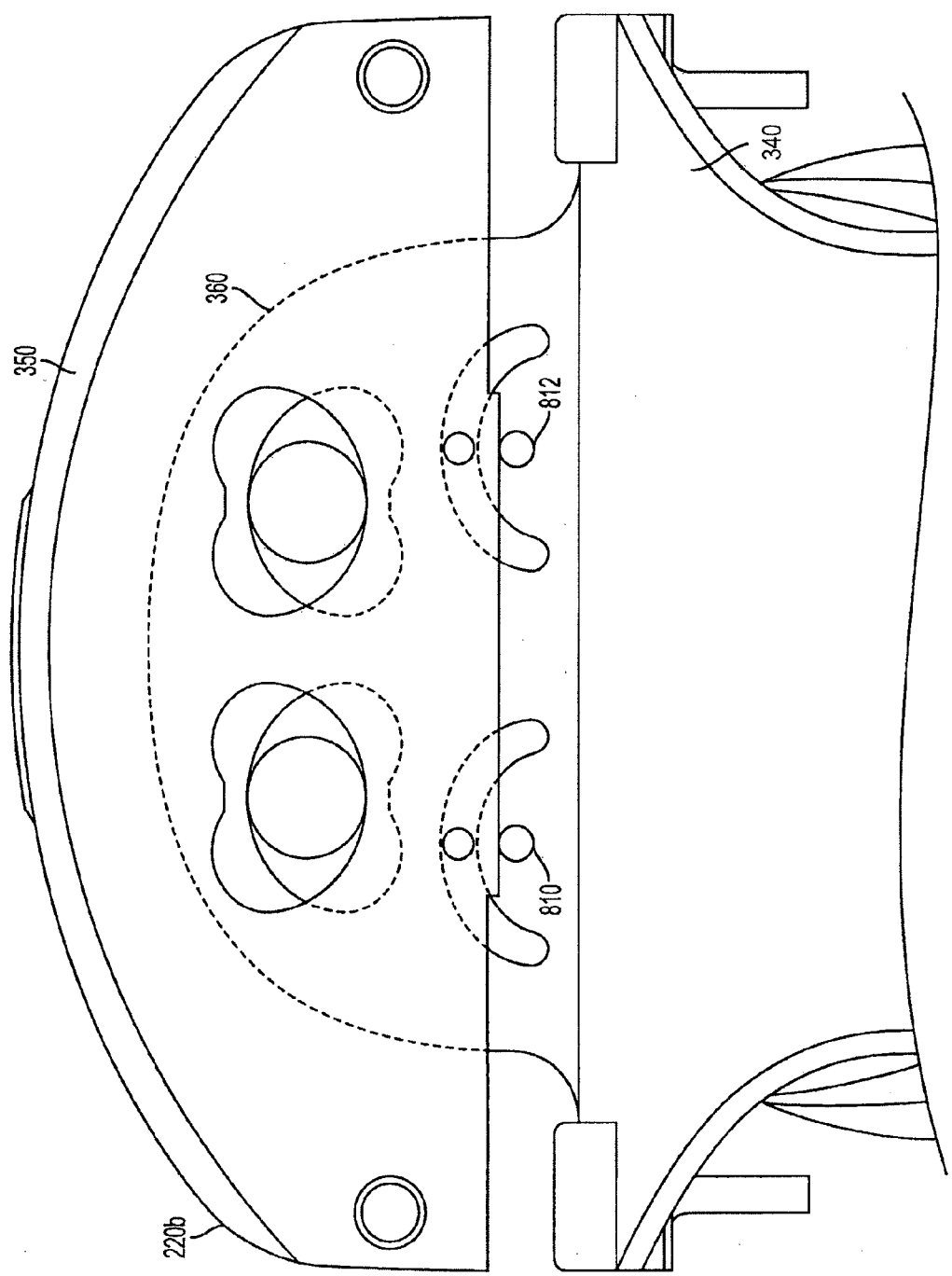
FIG. 8 illustrates a front view of a lobe from the crankshaft of FIG. 2 in accordance with an exemplary embodiment.

FIG. 8 illustrates a front view of a lobe 220b with a torsional absorber 230 in accordance with an exemplary embodiment. When the crankshaft 124 is placed within the engine 120, the crankshaft 124 is balanced. To assist in the balancing of the crankshaft 124, torsional absorber 230 includes first and second pegs 810, 812 that extend out of the flange 360 and support the pendulum 350. The pegs 810, 812 are used to place the pendulum 350 in a position the pendulum 350 would be when the crankshaft 124 is rotating. Once the crankshaft 124 is balanced, the pegs 810, 812 are removed.

Figure 9:
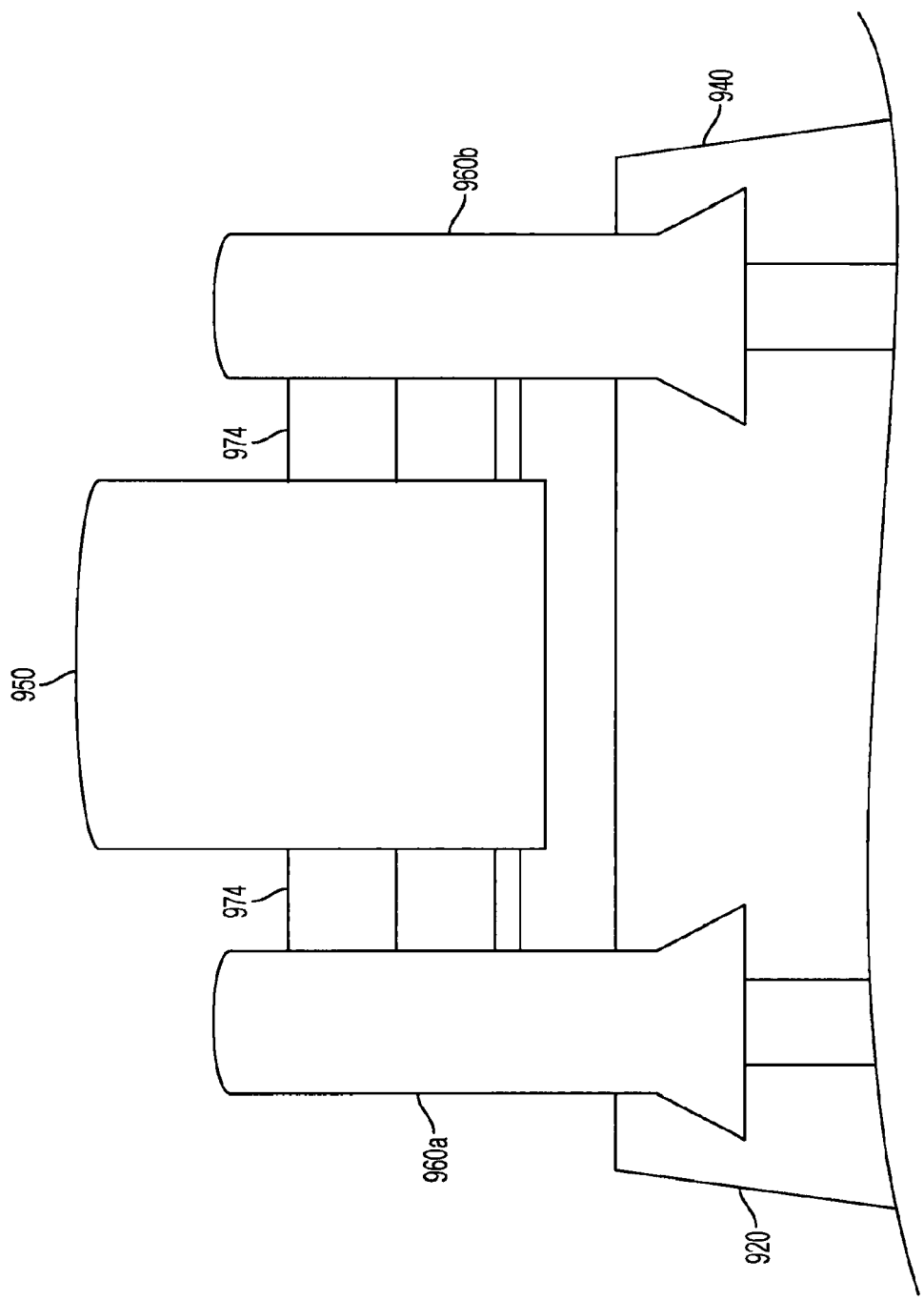
FIG. 9 illustrates a side view of a lobe in accordance with an exemplary embodiment.
Figure 10:
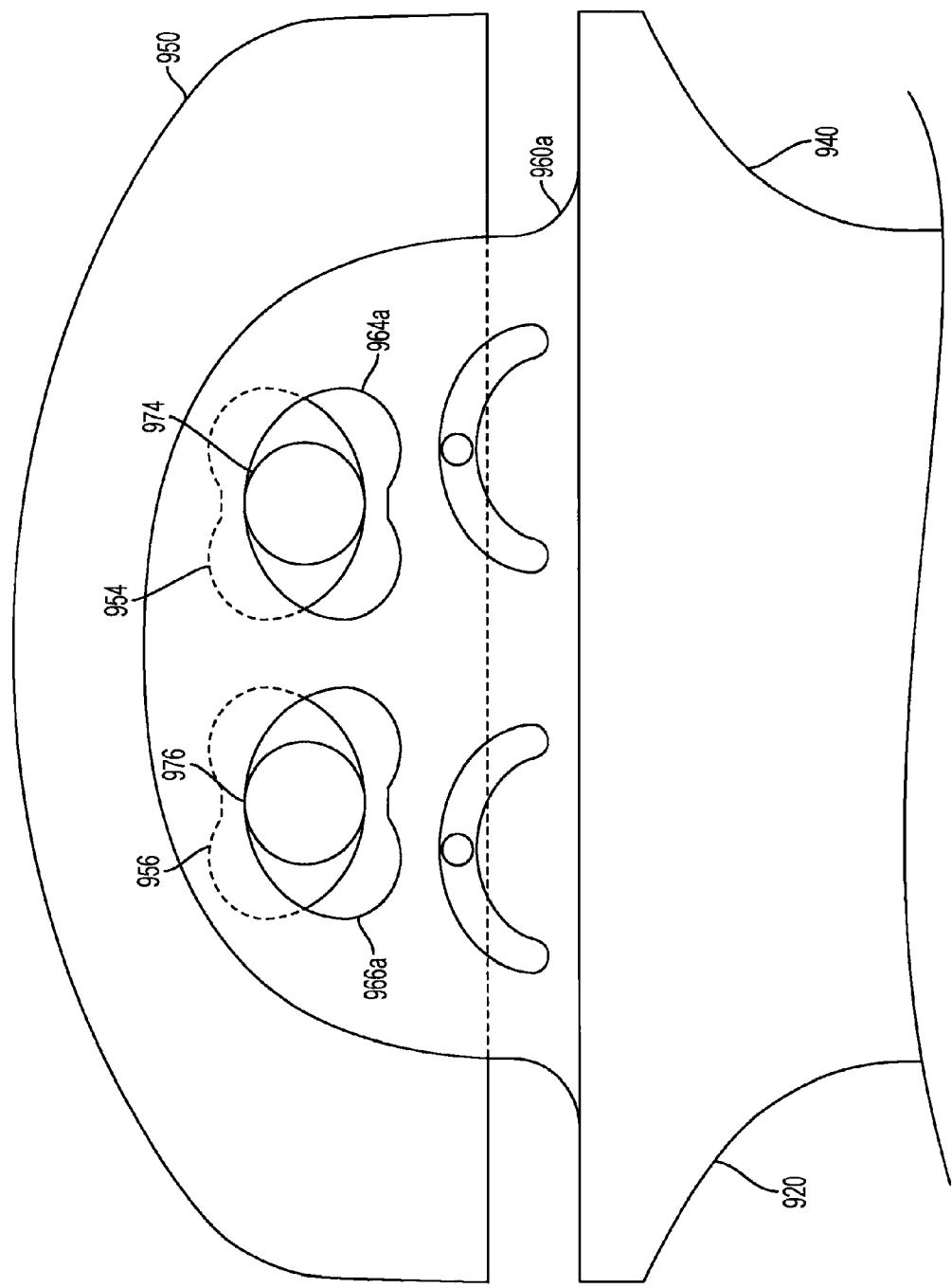
FIG. 10 illustrates a front view of the lobe of FIG. 9 in accordance with an exemplary embodiment.

FIG. 9 illustrates a side view of a lobe 920 with first and second flanges 960a, 960b in accordance with an exemplary embodiment. The first flange 960a is removably coupled to an end of the body 940 on a first side. The second flange 960b is removably coupled to the end of the body 940 on a second side, opposite the first side. A pendulum 950 is positioned between and pivotally coupled to the first and second flanges 960a, 960b by first pins 974 and second pin 976 (FIG. 10). The first and second pins 974, 976 extend through the pendulum 950 and couple to the first and second flanges 960a, 960b to provide the pendulum 950 with a limited range of free movement.

FIG. 10 illustrates a front view of the lobe 920 and first and second flange openings 964a, 966a in first flange 960a and first and second pendulum openings 954, 956 in pendulum 950. Second flange 960b also has first and second openings. (not illustrated). First and second first flange openings 964a, 966a and first and second flange openings have identical configurations and orientations that may be epicycloidal, circular, or cycloidal as discussed above with respect to FIG. 4. First and second pendulum openings 954, 956 have an identical configuration as first and second first flange openings 964a, 966a, but the orientation of the configurations are not identical. The configuration of the first flange openings 964a, 966a and second flange openings are rotated 180 degrees with respect to the configuration of the pendulum openings 954, 956. The configuration of the pendulum openings 954, 956, the first flange openings 964a, 966a, and the second flange openings allows the pendulum 950 to rotate and thereby absorb vibrations generated by the vehicle 100.

What is claimed is:

1. An apparatus for damping vibrations in an internal combustion engine, the apparatus comprising:
    a crankshaft comprising a lobe, the lobe comprising:
        a body;
        a flange coupled to the body, the flange having an opening therein;
        a pendulum having an opening therein; and
        a pin extending through the pendulum opening and the flange opening to pivotally couple the pendulum to the flange, the pendulum opening and the flange opening having a combined epicycloidal configuration defined by $p^2 = p_0^2 \lambda^2 S^2$ that lies on a continuum between a tautochronic configuration where $\lambda$ equals $\lambda_e$ and a cycloidal configuration where $\lambda$ equals 1, an epicycloidal configuration of the flange opening being rotated 180 degrees with respect to an epicycloidal configuration of the pendulum opening,
        where $p_0$ is a radius of curvature of a path corresponding to the pendulum apex, S is an arc length distance along the pendulum path from the apex, and $\lambda_e$ is the square root of the quantity $n^2$ over the sum $n^2+1$, where n is a target order to be corrected.

2. The apparatus of claim 1, wherein the flange is removably coupled to the body.

3. The apparatus of claim 2, wherein the flange couples to the body using a dovetail connection.

4. The apparatus of claim 2, wherein the body has a bolt opening that extends through the body from a first end to a second end of the body, the bolt opening accepting a bolt that fastens the flange to the second end of the body.

5. The apparatus of claim 1, wherein the flange has a curved slot that extends through the flange, the slot located between the body and the flange opening.

6. The apparatus of claim 5, wherein a peg extends through the curved slot and couples to the pendulum.

7. The apparatus of claim 1, wherein the pin is circular and movement of the pendulum causes the pin to roll along an inner surface of the pendulum opening and an inner surface of the flange opening.

8. The apparatus of claim 1, wherein the combined epicycloidal configuration of the pendulum opening and the flange opening causes the pendulum to follow an epicycloidal path when the crankshaft rotates.

9. The apparatus of claim 1, wherein the body has a stop pad located at a point where the pendulum contacts the body.

10. The apparatus of claim 1, wherein the pendulum surrounds a portion of the flange.

11. The apparatus of claim 10, wherein the pendulum has a plate that covers the pendulum opening to secure the pin within the pendulum opening and the flange opening.

12. The apparatus of claim 1, further comprising a second flange, the second flange having a second opening, the pin extending through the second opening to pivotally couple the pendulum to between the flange and second flange.

13. The apparatus of claim 1, wherein the pendulum is comprised of copper tungsten, tungsten carbide or other tungsten alloy.

14. An apparatus for damping vibrations in an internal combustion engine, the apparatus comprising:
    a crankshaft comprising a plurality of lobes, at least one of the lobes acting as a torsional absorber, the at least one lobe comprising:
        a body;
        a flange coupled to the body, the flange having a first opening;
        a pendulum having a first opening; and
        a pin extending through the first pendulum opening and the first flange opening to pivotally couple the pendulum to the flange, the first pendulum opening and the first flange opening each having an epicycloidal configuration defined by $p^2 = p_0^2 - \lambda^2 S^2$ so that the pendulum follows an epicycloidal path that lies between a tautochronic path where $\lambda$ equals $\lambda_e$ and a cycloidal path where $\lambda$ equals 1 when the crankshaft is rotated, the epicycloidal configuration of the first flange opening being rotated 180 degrees with respect to the epicycloidal configuration of the first pendulum opening,
        where $p_0$ is a radius of curvature of a path corresponding to the pendulum apex, S is an arc length distance along the pendulum path from the apex, and $\lambda_e$ is the square root of the quantity $n^2$ over the sum $n^2+1$, where n is a target order to be corrected.

15. The apparatus of claim 14, wherein more than one lobe acts as a torsional absorber.

16. The apparatus of claim 15, wherein the pendulums of the more than one lobes acting as torsional absorbers all follow the same epicycloidal path when the crankshaft is rotated.

17. The apparatus of claim 14, wherein the flange has a second opening and the pendulum has a second opening.

18. The apparatus of claim 17, wherein a second pin extends through the second pendulum opening and the second flange opening.

19. The apparatus of claim 14, wherein the pendulum is comprised of copper tungsten, tungsten carbide or other tungsten alloy.

20. A method of forming an apparatus for damping vibrations in an internal combustion engine, the method comprising:
   forming an epicycloidal opening in a flange;
   forming an extension on one end of the flange;
   forming a channel that corresponds to the extension on a lobe of a crankshaft;
   sliding the extension of the flange into the channel of the lobe;
   aligning an epicycloidal opening in a pendulum with the epicycloidal opening in the flange, wherein the epicycloidal opening in the flange is rotated 180 degrees with respect to the epicycloidal opening in the pendulum; and
   placing a pin within the pendulum opening and the flange opening to pivotally couple the pendulum to the flange such that the pendulum follows an epicycloidal path defined by $p^2 = p_0^2 - \lambda^2 S^2$ that lies between a tautochronic path where $\lambda$ equals $\lambda_e$ and a cycloidal path where $\lambda$ equals 1 when the crankshaft is rotated,
   where $p_0$ is a radius of curvature of a path corresponding to the pendulum apex, S is an arc length distance along the pendulum path from the apex, and $\lambda_e$ is the square root of the quantity $n^2$ over the sum $n^2+1$, where n is a target order to be corrected.

21. The method of claim 20, further comprising placing a peg through a curved slot that extends through the flange, the slot located between the lobe and the flange opening.

22. The method of claim 20, further comprising removing a rod from a flange, the rod balancing the pendulum during the step of placing the pin.

* * * * *